US011135783B2

(12) United States Patent
Shewchuk et al.

(10) Patent No.: US 11,135,783 B2
(45) Date of Patent: Oct. 5, 2021

(54) SYSTEM AND METHOD FOR MANUFACTURING COMPOSITE STRUCTURES

(71) Applicant: The Boeing Company, Chicago, IL (US)

(72) Inventors: Steven Michael Shewchuk, St. Louis, MO (US); Michael Matlack, St. Louis, MO (US); Timothy J. Luchini, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 16/142,819

(22) Filed: Sep. 26, 2018

(65) Prior Publication Data

US 2020/0094490 A1 Mar. 26, 2020

(51) Int. Cl.
*B29C 70/34* (2006.01)
*B29C 70/54* (2006.01)
*B29L 31/30* (2006.01)
*B29K 101/10* (2006.01)

(52) U.S. Cl.
CPC ............ *B29C 70/342* (2013.01); *B29C 70/54* (2013.01); *B29K 2101/10* (2013.01); *B29L 2031/3076* (2013.01)

(58) Field of Classification Search
CPC .................. B29C 70/342; B29C 70/54; B29L 2031/3076; B29K 2101/10; Y02T 50/40
See application file for complete search history.

(56) References Cited

U.S. PATENT DOCUMENTS

| 5,098,496 A | * | 3/1992 | Breitigam ............ B29C 70/521 |
| | | | 156/180 |
| 6,096,164 A | | 8/2000 | Benson |
| 7,083,698 B2 | | 8/2006 | Engwall |
| 7,422,714 B1 | | 9/2008 | Hood et al. |
| 10,391,684 B1 | | 8/2019 | Margraf, Jr. et al. |
| 2004/0054438 A1 | | 3/2004 | Brogardh |
| 2004/0188882 A1 | | 9/2004 | Matsumoto et al. |
| 2005/0023414 A1 | | 2/2005 | Braun |
| 2005/0172750 A1 | | 8/2005 | Kock |

(Continued)

FOREIGN PATENT DOCUMENTS

| FR | 2779988 A1 * 12/1999 | ............ B29C 70/44 |
| FR | 2894874 A1 6/2007 | |

(Continued)

OTHER PUBLICATIONS

EP, Extended European Search Report, Application No. 19199825.9-1017, pp. 2-6, dated Jul. 2, 2020.

(Continued)

*Primary Examiner* — Francisco W Tschen
*Assistant Examiner* — Abhishek A Patwardhan
(74) *Attorney, Agent, or Firm* — Vivacqua Crane

(57) ABSTRACT

A system and method of forming a composite structure includes heating an outer mold line surface of a tool to a processing temperature, positioning an inner mold line surface with a composite preform disposed thereon within the outer mold line surface, and extracting the inner mold line surface and the composite preform in a gelled state from the outer mold line surface.

23 Claims, 8 Drawing Sheets

(56) References Cited

U.S. PATENT DOCUMENTS

| | | | |
|---|---|---|---|
| 2005/0258575 A1* | 11/2005 | Kruse | B29C 70/446 |
| | | | 264/512 |
| 2006/0108058 A1 | 5/2006 | Chapman | |
| 2007/0211817 A1 | 9/2007 | Chen | |
| 2010/0154990 A1* | 6/2010 | Brennan | B29C 33/485 |
| | | | 156/285 |
| 2010/0200168 A1 | 8/2010 | Oldani | |
| 2012/0073738 A1 | 3/2012 | Crothers | |
| 2012/0118487 A1* | 5/2012 | Havens | B29C 53/824 |
| | | | 156/165 |
| 2012/0286457 A1* | 11/2012 | Everhart | B29C 33/485 |
| | | | 264/531 |
| 2015/0137424 A1* | 5/2015 | Lyons | B29C 70/342 |
| | | | 264/317 |
| 2015/0137430 A1* | 5/2015 | Lyons | B29C 33/505 |
| | | | 264/554 |
| 2016/0001472 A1* | 1/2016 | Downs | B29C 70/202 |
| | | | 156/196 |
| 2016/0159057 A1* | 6/2016 | Butler | B29C 73/10 |
| | | | 156/285 |
| 2016/0297108 A1* | 10/2016 | Lyons | B29C 70/446 |

FOREIGN PATENT DOCUMENTS

| | | |
|---|---|---|
| WO | 9854046 A2 | 12/1998 |
| WO | 2012064441 A2 | 5/2012 |
| WO | 2014070379 A1 | 5/2014 |

OTHER PUBLICATIONS

Ginger Gardiner, "Smart tooling cuts time and risk for complex unitized composite structures production," Feb. 2016, https://www.compositesworld.com/articles/smart-tooling-cuts-time-and-risk-for-complex-unitized-composite-structures-production.

Smart Bladders, http://smarttooling.com/products/smart-bladders, last accessed on Aug. 28, 2018.

NL, Search Report, NL Patent Application NL2021878, dated Jul. 17, 2019.

* cited by examiner

SYSTEM AND METHOD FOR MANUFACTURING COMPOSITE STRUCTURES

FIELD

The present disclosure relates to manufacturing components for aircraft. More specifically, the present disclosure relates to a system and method for fabricating composite structures for aircraft.

INTRODUCTION

Aircraft are being designed and manufactured with greater percentages of composite materials. A composite material generally includes reinforcing fibers bound in a polymer resin matrix. The fiber may be unidirectional or may take the form of a woven cloth or fabric. The fibers and resins are arranged and cured to form a composite structure, such as, for example barrel sections of aircraft.

Currently, composite barrel sections are manufactured with fixed tooling based upon either the inner mold line or the outer mold line of the part being fabricated. This method of manufacturing places a layup on a mandrel, then manually covers the layup with vacuum bags and caul plates. The layup is then consolidated using the vacuum bags. The consolidated layup is then placed into an autoclave for heating and compressing until cured. This cure cycle, which may last 4 to 24 hours, ties up a large amount of resources. Moreover, the current process produces composite structures in series with a cycle time dictated by the cure cycle of 4 to 24 hours.

While current methods are useful for their intended purpose, there is a need in the art for a method and apparatus that reduces the resources required to manufacture these parts as well as address other possible issues.

SUMMARY

According to some aspects, a method of forming a composite structure includes heating an outer mold line surface of a tool to a processing temperature, positioning an inner mold line surface with a composite preform disposed thereon within the outer mold line surface, and extracting the inner mold line surface and the composite preform in a gelled state from the outer mold line surface.

According several other aspects, a mandrel for forming a gelled composite includes a bladder assembly that defines an inner mold line surface, wherein the bladder assembly has a shape memory layer and a bladder, and an end piece connected to the bladder assembly.

According to several other aspects, a system for manufacturing a composite structure includes a tooling assembly having a tool having a heating element and an outer mold line surface and a mandrel having a bladder assembly that defines an inner mold line surface. The mandrel is removably disposed within the tool. The tooling assembly further includes a control system having a temperature controller connected to the heating element and a pressure controller connected to the bladder assembly. A composite preform is disposed around the bladder assembly.

According to several other aspects, an apparatus includes a mandrel and a gelled composite preform wrapped around the mandrel.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
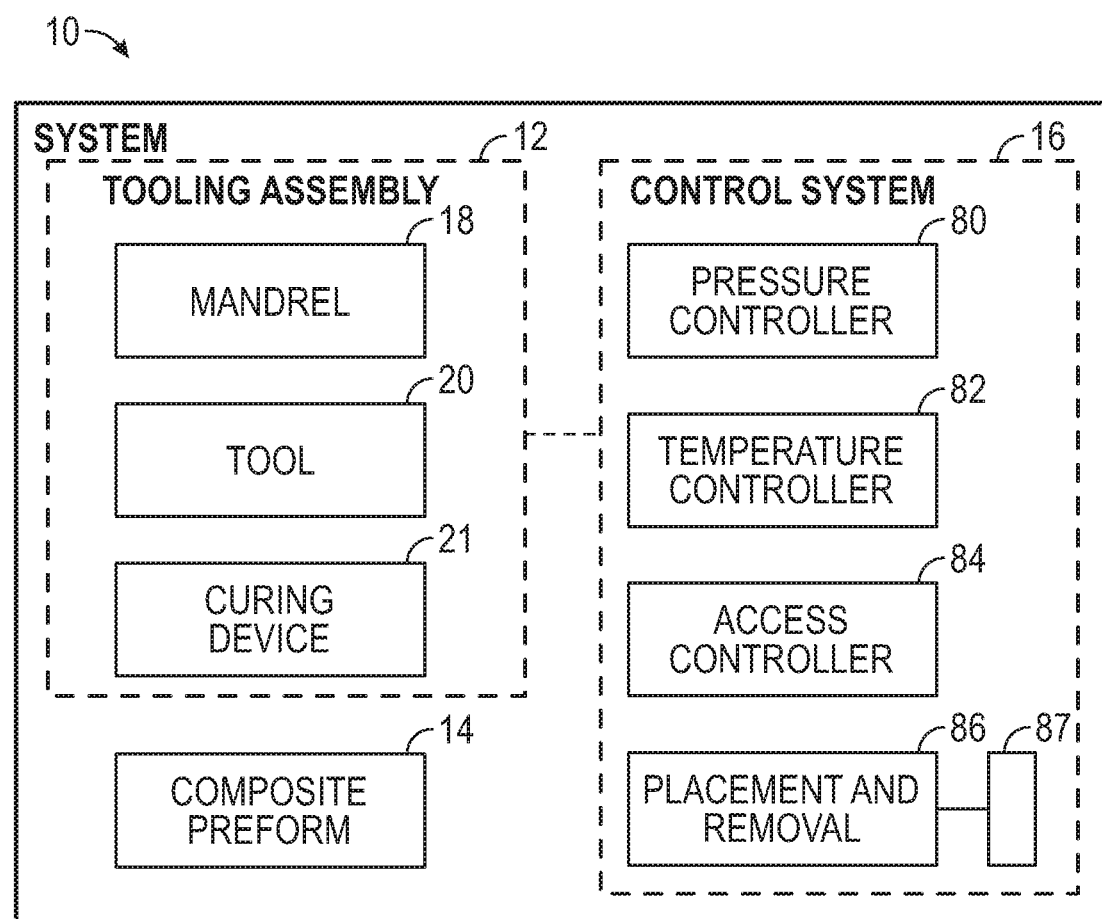
FIG. 1 is a system diagram of components of a composite manufacturing system in accordance with an illustrative embodiment.

Referring to FIG. 1, a system of manufacturing composite structures that utilize quick cure resins is generally indicated by reference number 10. In one example, the quick cure resins include resins that cure in about 30 minutes or less. As used herein, the term "about" is understood by those skilled in the art. Alternatively, the term "about" includes +/−5 minutes. The composite structures produced by the system 10 are preferably curved composite structures such as, for example, nacelles and barrels sections used to form the airframe of an aircraft. The system 10 generally includes a tooling assembly 12, a composite preform 14 that is loaded into the tooling assembly 12, and a control system 16 that is configured to control the operation of the tooling assembly 12.

Figure 2A:
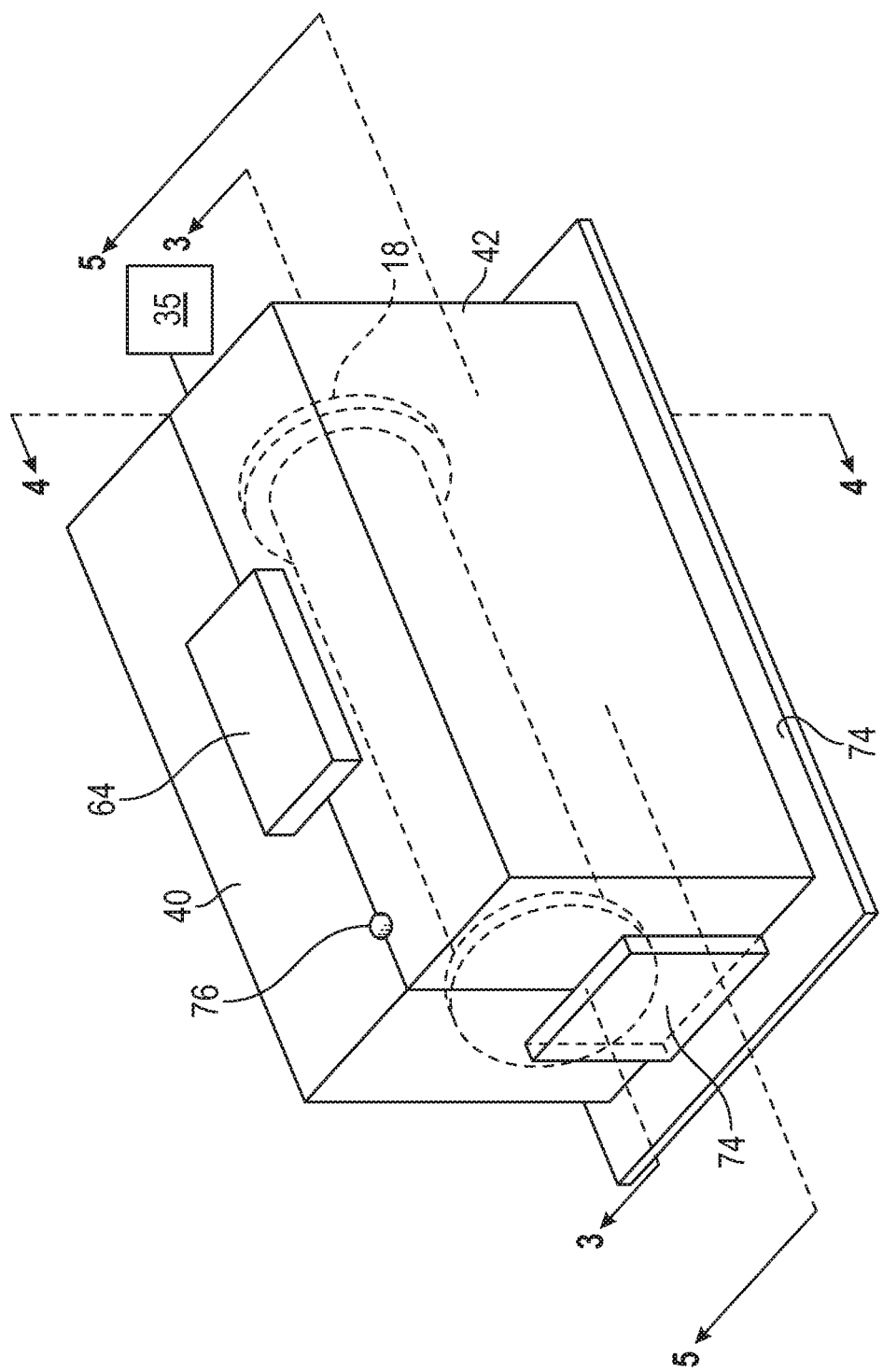
FIG. 2A is a side perspective view of a tool assembly of the composite manufacturing system in accordance with an illustrative embodiment.
Figure 2B:
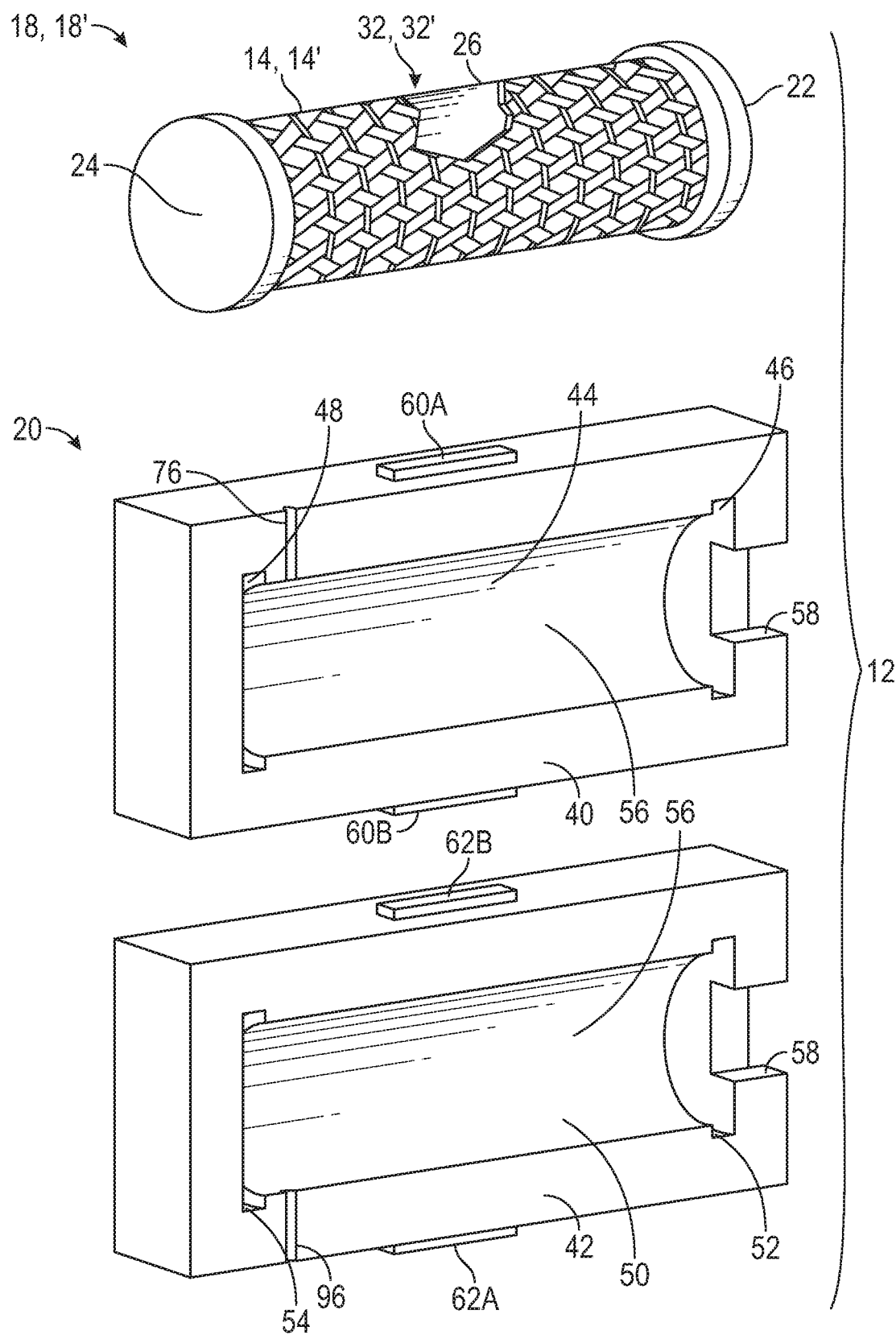
FIG. 2B is an exploded perspective view of the tool assembly of the composite manufacturing system in accordance with an illustrative embodiment.
Figure 3:
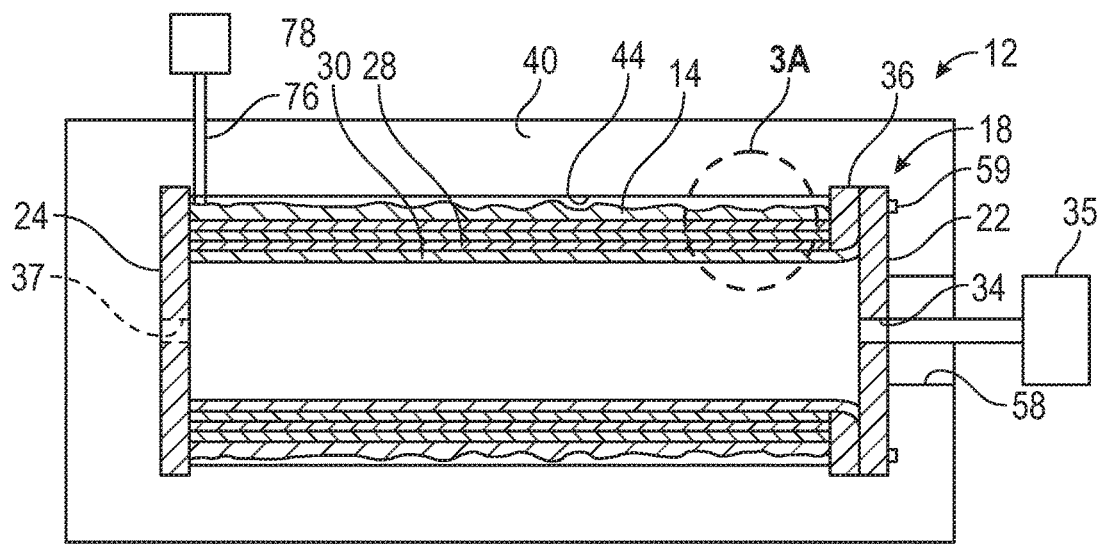
FIG. 3 is a cross-section view of the tool assembly with a composite preform disposed therein viewed in the direction of arrow 3-3 in FIG. 2A in accordance with an illustrative embodiment.

Turning to FIGS. 2A, 2B, 3, and 3A and with continued reference to FIG. 1, the tooling assembly 12 includes a mandrel 18, a tool 20, and a curing device 21. FIG. 2A shows a perspective side view of the tooling assembly 12 while FIG. 2B shows an exploded perspective view of the tooling assembly 12. The mandrel 18 is configured to support the composite preform 14 (shown in FIG. 2B) and define an inner mold line of the composite structure. The mandrel 18 is sized to be placed within the tool 20, as shown in FIG. 3. The mandrel 18 includes a first end piece 22 and a second end piece 24 connected to a bladder assembly 26. While in the example provided the mandrel 18 includes two end pieces 22 and 24, it should be appreciated that the mandrel 18 may include only the first end piece 22 without departing from the scope of the present disclosure. Where only the first end piece 22 is used, the first end piece 22 provides cantilevered support to the bladder assembly 26. The end pieces 22, 24 provides support to the bladder assembly 26 within the tool 20 and are the interface between the mandrel 18 and the tool 20. The end pieces 22, 24 also react to inflation pressure when the bladder assembly 26 is pressurized, as will be described below. The end pieces 22, 24 are, in the example provided, circular. A circular shape of the end pieces 22, 24 simplify manufacturing of the end pieces 22, 24. Also, a circular shape of the end pieces 22, 24 simplifies loading of the mandrel 18 into the tool 20 as it does not require indexing. However, where indexing, i.e. rotational alignment of the mandrel 18 relative to the tool 20, is desired, the end pieces 22, 24 have a non-circular shape. For example, the end pieces 22, 24 may be rectangular, triangular, or any other multi-sided shape.

FIG. 3 shows a cross-section of the tooling assembly 12 with the composite preform 14. The bladder assembly 26 is configured to provide rigid support for the composite preform 14 prior to cure and to provide flexible support and provide compression during the cure. The bladder assembly 26 includes a shape memory layer 28 and a bladder 30 disposed within the shape memory layer 28. An outer surface of the shape memory layer 28 defines an inner mold line (IML) surface 32. The IML surface 32 in turn defines an inner mold line of the composite structure. The shape memory layer 28 surrounds the bladder 30 and is made of a shape memory polymer. The shape memory polymer changes rigidity in response to a change in a parameter, such as temperature. Thus, the shape memory layer 28 has a rigid state and a softened, flexible state. The rigid state is present at room temperature, and when heated above a threshold temperature, the shape memory layer 28 transitions to the flexible state. Room temperature is a temperature where the composite preform 14 can be layed upon the mandrel 18. The material processing specifications will dictate the room temperature range. For example, room temperature may be about 43° C. for a particular type of fiber reinforced material. As used herein, the term "about" is understood by those skilled in the art. Alternatively, the term "about" includes +/−10 degrees. In another embodiment, room temperature may be about 27° C. for another type of fiber reinforced material. As used herein, the term "about" is understood by those skilled in the art. Alternatively, the term "about" includes +/−10 degrees. In other examples, room temperature could be a few degrees below threshold temperature. The threshold temperature is a temperature above room temperature and in particular arrangements is above temperatures employed in curing operations as described below. In a particular arrangement, the shape memory layer 28 transitions to a softened flexible state at about 65° C. As used herein, the term "about" is understood by those skilled in the art. Alternatively, the term "about" includes +/−10 degrees.

The bladder 30 is airtight and inflatable. In one embodiment, the bladder 30 is made of silicone, though it should be appreciated that other inflatable materials may be used. A port 34 disposed through the first end piece 22 provides access to the bladder 30. The bladder 30 is inflated, for example, by pressurizing the bladder 30 with air, nitrogen, steam or oil. The air, nitrogen, steam or oil is provided by a pressurization system 35 (shown in FIGS. 2A and 3) that communicates with the bladder 30 via the port 34 The pressurization system 35 includes, for example, a source of pressurized air, nitrogen, steam or oil, a pump, a pressure sensor, a pressure relief valve, and supply lines. The pressure relief valve ensures of the pressurization system 35 ensures that the pressure exerted on the OML surface 56 does not exceed a pressure that forces the tool 20 open. In particular arrangements, the bladder 30 is inflated to a pressure of about 620 kPa. As used herein, the term "about" is understood by those skilled in the art. Alternatively, the term "about" includes +/−50 kPa. In various arrangements, the inflation pressure is as low as 100 kPa or as high as 2100 kPa. The inflation pressure of the bladder 30 is selected based on the material of the composite preform 14. The bladder 30 in one example expands to about 10% by volume, in another example by about 2% to about 3% by volume, and in a preferred example by about 1% by volume. As used herein, the term "about" is understood by those skilled in the art. Alternatively, the term "about" includes +/−1% by volume. In one embodiment, a port 37 is disposed through the second end piece 24 to allow faster filling of the bladder 30 and allow recirculation of air across the tool 20

The bladder assembly 26 may be attached and sealed to the end pieces 22, 24 in various ways so long as the end pieces 22, 24 together, or individually, support the bladder assembly 26, the composite preform 14, the pressurization system 35, any sensors, etc. In the example provided, the shape memory layer 28 is sandwiched between the end pieces 22, 24. The bladder 30 is attached at one end to the second end piece 24 and is sandwiched between the first end piece 22 and a backing plate 36 at another end. In another embodiment, both the shape memory layer 28 and the bladder 30 are sandwiched between backing plates 36 and the end pieces 22, 24. In another embodiment, both the shape memory layer 28 and the bladder 30 are bonded to the end pieces 22, 24 by, for example, an adhesive such that the end pieces 22, 24 are not removed during the use of the bladder assembly 26. In yet another embodiment, the end pieces 22, 24 are removable from the bladder assembly 26.

The bladder assembly 26 may have other configurations without departing from the scope of the present disclosure. For example, the shape memory layer 28 may be removed and a water-soluble or solvent soluble inner mandrel is disposed within the bladder 30. In this embodiment, the bladder 30 defines the IML surface 32. The soluble inner mandrel provides rigidity at room temperature but then is dissolved when the bladder 30 is inflated with water.

Continuing to refer to FIGS. 2, 2A and 3, 3A, the tool 20 is configured to gel the composite preform 14 and may be either self-heated or be disposed within an oven. The tool 20 defines an outer mold line of the finished part. The tool 20 includes a first component 40 and a second component 42 configured to be mated together. The first component 40 defines a first outer mold line (OML) surface 44 disposed within the first component 40. The first component 40 also defines two slots 46, 48 positioned on either end of the first OML surface 44. Similarly, the second component 42 defines a second outer mold line (OML) surface 50 disposed within the second component 42. The second component 42 also defines two slots 52, 54 positioned on either end of the second OML surface 50. When the first component 40 and the second component 42 are mated together, the first OML surface 44 and the second OML surface 50 cooperate to define a volume in which the mandrel 18 and composite preform 14 are positioned. Thus, the first OML surface 44 and the second OML surface 50 collectively form an outer mold line (OML) surface 56 that defines an outer mold line of the composite structure. The outer mold line surface 56 is made of any suitable material such as, for example, steel, Invar, aluminum or composites. In addition, when the first and second components 40, 42 are mated together, the slots 46 and 52 cooperate to accommodate the first end piece 22, while the slots 48 and 54 cooperate to accommodate the second end piece 24. An opening 58 is disposed through the slots 46, 52 such that the interior volume of the tool 20, and therefore the port 34 disposed in the first end piece 22 of the mandrel 18, is accessible when the first component 40 is mated to the second component 42.

While in the example provided the OML surface 56 is barrel shaped, or cylindrical, it should be appreciated that the OML surface 56 may have various shapes to accommodate various desired finished parts, such as different sections of an aircraft fuselage, engine nacelle panels, etc. Likewise, while in the example provided the slots 46, 48, 52, 54 are semi-cylindrical to accommodate the end pieces 22, 24, it should be appreciated that the slots 46, 48, 52, 54 may have various shapes to accommodate the shape of the end pieces 22, 24. Thus, slots 46, 48, 52, 54 help support the bladder assembly 26 and composite preform 14 during processing within the components 40 and 42. For example, where the end pieces 22, 24 are not circular, the slots 46, 48, 52, 54 are non-semicircular which aids in the use of non-radially symmetric tooling and aids in the indexing of the mandrel 18 in the tool 20. Where only the first end piece 22 is used, the tool may include only the slots 46, 52. In certain arrangements, the components 40, 42 have threaded regions disposed within the slots 46, 48, 52, 54 such that one or both end pieces 22 and 24 can be threaded into the tool 20. The opening 58 allows the bladder 30 to be pressurized when the mandrel 18 is disposed within the tool 20. The opening 58 also provides an access point for sensors, control devices, real time monitoring and control of the process, etc.). A gasket 59 is disposed between the first end piece 22 and the tool 20 to seal around the opening 58. In addition, additional seals (not shown) may be provided between the opening 58 and any lines, conduits, etc. entering the opening 58.

Figure 4:
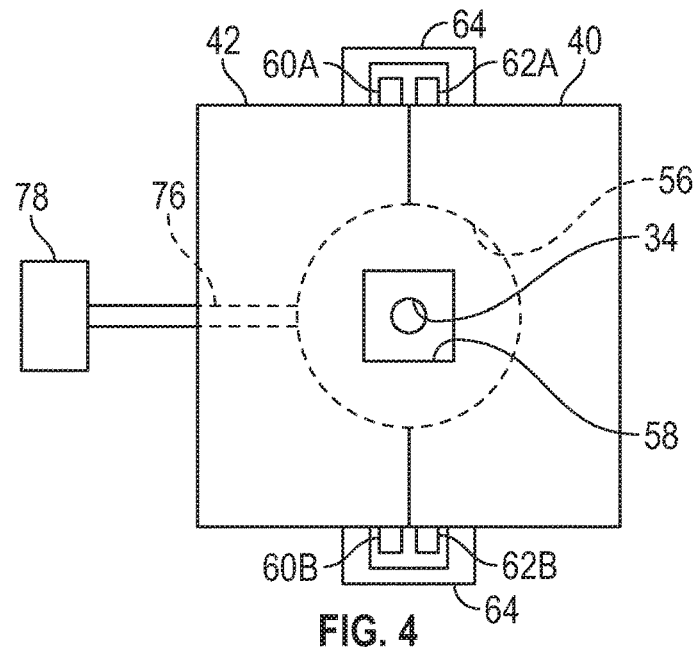
FIG. 4 is a schematic diagram of an end view of the tool assembly viewed in the direction of arrow 4-4 in FIG. 2A in accordance with an illustrative embodiment.

Turning to FIG. 4 which shows an end view of the tooling assembly 12, the first component 40 may be secured to the second component 42 in various ways. In the example provided, the first component 40 includes a pair of features 60A, 60B and the second component 42 includes a pair of features 62A, 62B. A pair of latching mechanisms 64 engages the features 60A, 62A and 60B, 62B to clamp the first component 40 to the second component 42. In other embodiments, the first component 40 is connected to the second component 42 by hydraulics, bolts, pins, etc.

Figure 5:
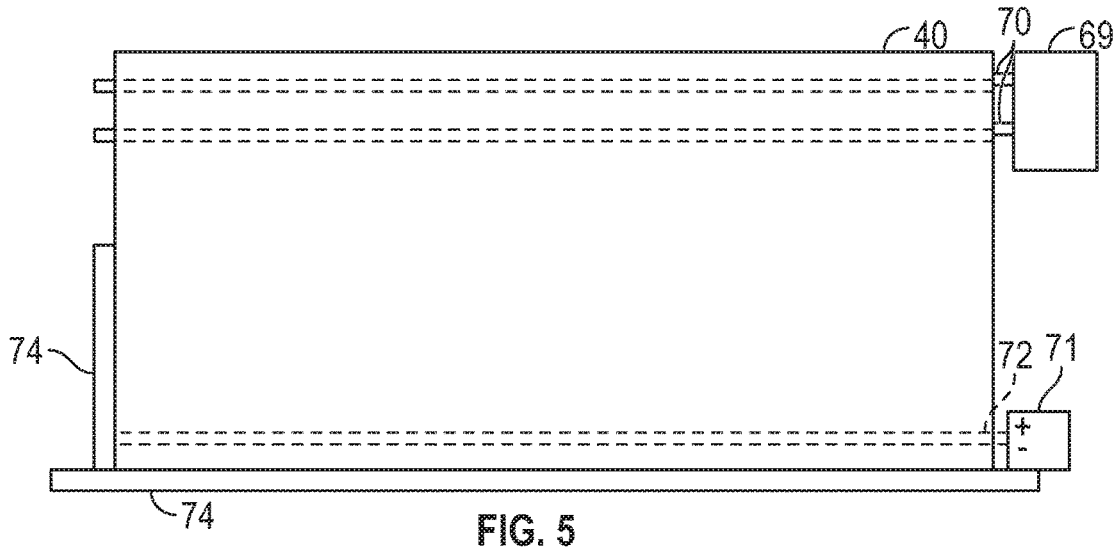
FIG. 5 is a schematic diagram side view of the tool assembly in accordance with an illustrative embodiment.

With reference to FIG. 5, which shows a schematic side view of the tooling assembly 12, the OML surface 56 of the tool 20 may be heated by one or more heating elements indicated by reference numbers 69, 70, 71, 72, and 74. In one example, an external heating system 69 is connected to the tool 20. The external heating system 69 provides hot oil to tubes 70 that run through the tool 20. The hot oil is pumped and circulated through the tubes 70 and heats the OML surface 56. In this configuration the tool 20 is preferably placed vertically such that the first end piece 22 of the mandrel 18 is disposed above the second end piece 24. In another example, an external electrical system 71 is connected to electric wires 72 that run through the tool 20. The external electrical system 71 generates resistance heating in the electrical wires 72 and heats the OML surface 56. In another example, one or more external heat sources 74 such as cartridges heaters, heater blankets or mats, inductive heaters, an oven, or use of a heater platen on a press, etc., are connected to the tool 20 to heat the tool 20 and the OML surface 56. In another example, the pressurization system 35 used to inflate the bladder 30 may be used to heat the tool 20. The OML surface 56 is heated by internally heating the bladder 30 after the mandrel 18 is placed in the tool 20. For example, the OML surface 56 is heated by internally heating the bladder 30 with heated nitrogen, heated air, hot oil or steam from the pressurization system 35. For example, heated liquid or heated pressurized air is pumped through fluid lines that run through the opening 58 of the tool 20 and the port 34 of the mandrel 18 into the bladder 30. The mandrel 18 and tool 20 may be employed during processing horizontally, as shown in the figures, or vertically, not shown.

As noted above, the composite preform 14 is placed about the mandrel 18. While the composite preform 14 is illustrated as a braided structure, it should be appreciated that other structures, such as a preform of unidirectional fibers, may be employed. The composite preform 14 covers the entire IML surface 32 in certain arrangements, while in other arrangements, the composite preform 14 covers all or a portion of the IML surface 32. The composite preform 14 may be placed onto the mandrel 18 by, for example, a tape or tow laying machine or a fabric draping system or a braiding system. The fibers in the composite preform 14 are unidirectional or take the form of a woven cloth or fabric. In various arrangements, the composite preform 14 is impregnated with a quick cure resin, such as those that are gelled in about 30 minutes or less. In various arrangements, the bladder 30 is inflated at temperatures above, for example, 65° C. and then cooled into a rigid shape of the inner mold line bladder upon which the composite preform 14 is placed. In particular arrangements, the composite preform 14 is impregnated with a thermoset resin. In certain arrangements, the fibers are multiaxial, such as, for example, biaxial or triaxial. In various arrangements, the fibers in the composite preform are carbon fibers, fiberglass, aramid fibers or boron fibers.

Figure 3A:
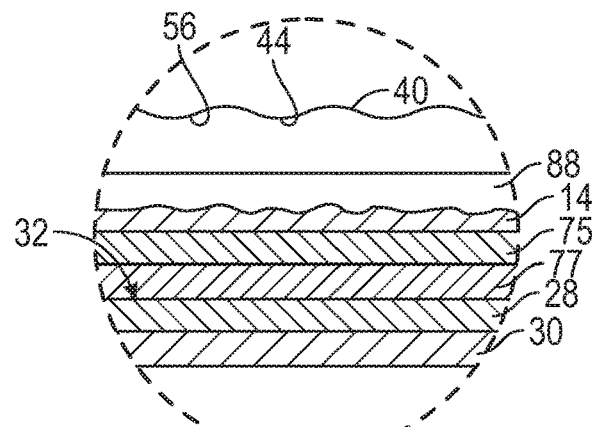
FIG. 3A is a partial cross-section view of an alternate embodiment of the tool assembly with a composite preform disposed therein.

FIG. 3A shows an expanded, cross-section view of an alternate embodiment of the mandrel 18 and composite preform 14. In FIG. 3A, a woven fabric or breather material 75 is placed between the composite preform 14 and the IML surface 32 to aid in air evacuation during the fabrication process. Air may be evacuated via vacuum ports 76, shown in FIGS. 3 and 4, that communicate with the OML surface 56. In one embodiment, the vacuum ports 76 connect with a vacuum source 78 that generates a vacuum. Applying a vacuum to the composite preform 14 draws the composite preform 14 closer to the OML surface 56. The vacuum may also draw the inner mold line surface 32 closer to the outer mold line surface 56. The breather material 75 aids in composite processing by removing any dissolved gas or solvent in the composite preform 14 and to aid in a more even distribution of the vacuum. In another embodiment, the vacuum ports 76 communicate with the ambient environment and allow for air to leave the tool 20 when the bladder 30 is inflated. In certain arrangements, a mold release coating 77, such as FREKOTE 700NC, is disposed between the composite preform 14 and the IML surface 32. Alternatively, a barrier film (not shown), such as, for example, PTFE film, FEP film, other suitable release films, may be used in place of the mold release coating 77.

Returning to FIG. 1, and with continued reference to FIGS. 2-5, the control system 16 is configured to control the operation of the tooling assembly 12. The control system 16 includes a pressure controller 80, a temperature controller 82, an access controller 84 and placement and removal controller 86. The pressure controller 80 monitors the pressure of the bladder 30, for example, with a pressure transducer or sensor and maintains the pressure of the bladder 30 at a specified pressure by controlling the pressurization system 35. The temperature controller 82 monitors, for example, with a thermocouple, the temperature of the IML surface 32 and the OML surface 56 and maintains each at a specified temperature, such as the process temperature, by controlling the pressurization system 35 (FIG. 3) and/or the heating elements 69, 70, 71, 72, 74 (FIG. 5). In particular arrangements, either or both the temperature controller 82 and the pressure controller 80 are proportional-integral-derivative (PID) controllers. The access controller 84 controls the opening and closing of the tool 20 to provide access therein. The placement and removal controller 86 controls a mechanism 87 that engages the mandrel 18 to position the mandrel 18 with the composite preform 14 in the tool and to remove the mandrel 18 with the composite preform 14 from the tool 20.

The OML surface 56 is heated to a desired processing temperature prior to the placement of the mandrel 18 and composite preform 14 within the tool 20 or is heated by internally heating the bladder 30 after placement of the mandrel 18 and composite preform 14. Since the temperature of the OML surface 56 is at an elevated temperature, the mandrel 18 with the composite preform 14 is placed in the tool 20 with the automated process that utilizes the mechanism 87. The mechanism 87 is preferably one or more robotic arms or grasping mechanisms configured to grasp, place, and/or remove the mandrel 18 from the tool 20. In particular arrangements, the mandrel 18 and the composite preform 14 are placed in the tool 20 and removed from the tool 20 with a forklift, a crane, manually or by some other suitable means.

In various arrangements, the mandrel 18 along with the composite preform 14 wrapped around the IML surface 32 is placed in the tool 20 prior to the inflation of the bladder 30. When placed in the tool 20, the composite preform 14 is slightly undersized and an air gap 88 exists between the composite preform 14 and the OML surface 56, shown in FIGS. 3 and 3A. The composite preform 14 is compressed between the IML surface 32 and the OML surface 56 as the bladder 30 is inflated. In various arrangements, a vacuum via vacuum port 76 is applied to the composite preform 14 to further enhance the compression of the composite preform 14 against the OML surface 56

In one embodiment, the processing temperature for the OML surface 56 is about 180° C. In other embodiments, the processing temperature is between about 180° C. and about 215° C. As used herein, the term "about" is understood by those skilled in the art. Alternatively, the term "about" includes +/−10° C. After about 30 minutes of exposure to the elevated temperature, the resin in the composite preform 14 is in a gelled state. In a gelled state, the resin and the fibers of the composite preform 14 are sufficiently self-supporting that the composite preform 14 can be removed from the mandrel 18 without collapsing or deformation of the gelled composite preform 14. The mandrel 18 and the composite preform 14 are then removed from the tool 20. Where the mandrel 18 includes the shape memory layer 28, the mandrel 18 is heated to soften the IML surface 32 to enable removal of the mandrel 18 and composite preform 14 from the tool 20. In the softened state, the mandrel 18 can be expanded as desired and later while still in the softened state, the mandrel 18 can be deflated sufficiently to provide enough separation from the composite preform 14 to facilitate separation and removal from the mandrel 18. If the mandrel 18 includes the soluble inner mandrel described previously, the soluble inner mandrel is dissolved to facilitate the removal of the composite preform 14 from the tool 20. In particular arrangements, the composite preform 14 is removed from the mandrel 18 as well as the tool 20 and placed in the curing device 21. The curing device 21 is oven or other heating device configured for final curing of the gelled composite preform 14 into a composite structure. In some arrangements, both the mandrel 18 and the composite preform 14 are placed in the curing device 21 for final curing of the composite preform 14 into a composite structure, which is then removed from the mandrel 18 after the final curing process. The curing device 21 may be a single oven in certain arrangements, while in some arrangements, the curing device 21 is a conveyer or bath oven. In particular arrangements, the composite preform 14 is heated in an oil bath at the appropriate curing temperature. In some arrangements, the mandrel 18 is cooled such that the shape memory layer 28 transitions back into a rigid form prior to removing the cured composite preform 14 from the mandrel 18

In various arrangements, a second composite preform 14', similar to the ungelled composite preform 14, is positioned on the mandrel 18 after the cured composite preform 14 is removed from the mandrel 18. In other arrangements, the second composite preform 14' is positioned on a second mandrel 18' that is subsequently positioned in the tool 20.

Figure 6:
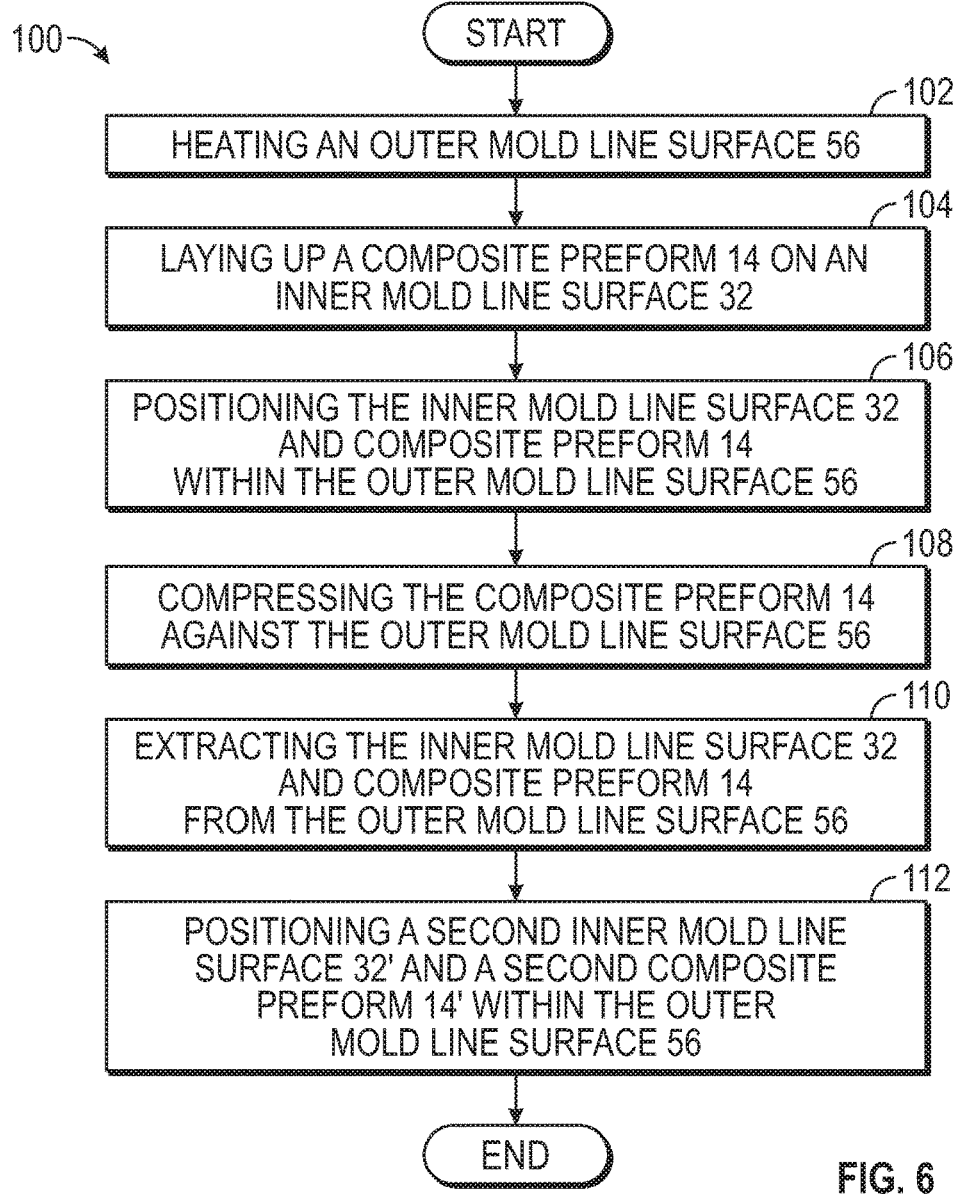
FIG. 6 is an illustration of an exemplary flow diagram of a method of forming a composite structure in accordance with an illustrative embodiment.

Turning now to FIG. 6, a flow diagram of an exemplary method 100 for manufacturing a composite structure is depicted for a particular embodiment. The method illustrated in FIG. 6 is implemented with the system 10 shown in FIG. 1. The system 10 utilizes tooling assembly 12, control system 16 with the composite preform 14 impregnated with a quick gel resin to increase the rate of production of composite structures. The system 10 eliminates or reduces the use of autoclave processes with less or no reliance on vacuum bags and caul plates. Hence, the system 10 reduces costs by eliminating or reducing the use of expensive curing of composite structures by eliminating or reducing the time associated with an autoclave process and, therefore, eliminating manpower associated with the placement of vacuum bags and caul plates. In addition, the system 10 reduces costs by maintaining a temperature of the tool 20 while sequentially inserting and removing mandrels 18 and composite preforms 14 therefrom, thus reducing costs and time associated with heating and cooling the tool 20.

In block 102, the OML surface 56 is heated, for example, to about 180° C. In certain arrangements, the OML surface 56 is heated to a processing temperature between about 180° C. to about 215° C. for quicker cure cycles. Cycling the OML surface 56 between about 180° C. to about 215° C. saves time and reduces costs over cycling between room temperature and about 215° C.

In block 104, the composite preform 14 is placed on the IML surface 32 of the mandrel 18. Where the composite preform 14 is a fabric prepeg product or a unidirectional prepreg product, the composite preform 14 may be wrapped on the mandrel 18. Where the composite preform 14 is a braided weave, the composite preform 14 is laid up on the mandrel 18. As mentioned above, the composite preform 14 is impregnated with a thermoset resin or a pre-impregnated tape or tow that facilitates quicker cure cycles. In certain arrangements the bladder 30 is inflated prior to positioning the composite preform 14 on the IML surface 32. Alternatively, the bladder 30 is expanded prior to placement of the composite preform 14. In particular arrangements, the composite preform 14 is at room temperature prior to be laid up on IML surface 32, which is also at room temperature. Where the bladder assembly 26 includes the shape memory layer 28, the shape memory layer 28 is rigid at room temperature and softens, for example, at about 65° C.

In block 106, the mandrel 18 and the composite preform 14 disposed on the IML surface 32 are positioned within the OML surface 56 of the tool 20. The end pieces 22, 24 support the IML surface 32 and the composite preform 14 within the tool 20. Either the bladder 30 has been previously inflated, or the bladder 30 is inflated, for example, by pressurized air, nitrogen, steam or oil by the pressurization system 35. In some arrangements, the bladder 30 is heated and pressurized by hot air, hot nitrogen, steam or hot oil.

In block 108, the composite preform 14 is compressed against the OML surface 56 by the inflation of the bladder 30. Due to the elevated temperature, the shape memory layer 28 flexes with the expansion of the bladder 30. The tool 20 is kept closed by the latching mechanism 64. The pressure relief valve of the pressurization system 35 ensures that the pressure exerted on the OML surface 56 does not exceed a pressure that forces the tool 20 open. The pressure sensor of the pressurization system 35 senses the pressure in the bladder 30 and the pressure controller 80 maintains a pressure in the bladder 30.

In block 110, the mandrel 18 and the composite preform 14 wrapped around the IML surface 32 are extracted from the OML surface 56 of the tool 20 when the composite preform 14 is in a gelled state. In some arrangements, a thermal profile determines when the composite preform 14 is in a gelled state by relating a temperature and time of heating to an expected amount of crosslinking. In other arrangements, a dielectric sensor is utilized to determine when the composite preform 14 is in a gelled state by registering an increase in capacitance that occurs during crosslinking of the resin. The composite preform 14 is then cured by the curing device 21 to form a composite structure. In certain arrangements, both the mandrel 18 and the gelled composite preform 14 are placed in the curing device 21, while in other arrangements the gelled composite preform 14 is removed from the mandrel 18 and then placed in the curing device 21 for final curing. In various arrangements, the mandrel 18 and the gelled composite preform 14 are removed from the tool 20 while the temperature of the OML surface 56 remains at the processing temperature. Subsequently, in block 112, a second mandrel 18' and a second composite preform 14' are placed in the tool 20 while the temperature of the OML surface 56 remains at the processing temperature. In various arrangements, the IML surface 32 is cooled naturally at room temperature or, for example, by a cooled liquid, into a rigid form prior to removing the cured composite structure from the mandrel 18. The bladder 30 is deflated when the composite preform 14 has gelled prior to removal from the tool 20.

As noted above, in various arrangements, a second composite preform 14' is laid upon the mandrel 18, while in other arrangements the second composite preform 14' is laid upon a second mandrel 18'. In either arrangement, the second composite preform 14' is placed in the tool 20 and is compressed against the OML surface 56 by the inflation of the bladder 30 or a second bladder 30' within the second mandrel 18'. The bladder 30 or the second bladder 30' along with the second composite preform 14' are then extracted from the tool 20. The second composite preform 14' is cured into a second composite structure by the curing device 21.

Figure 7:
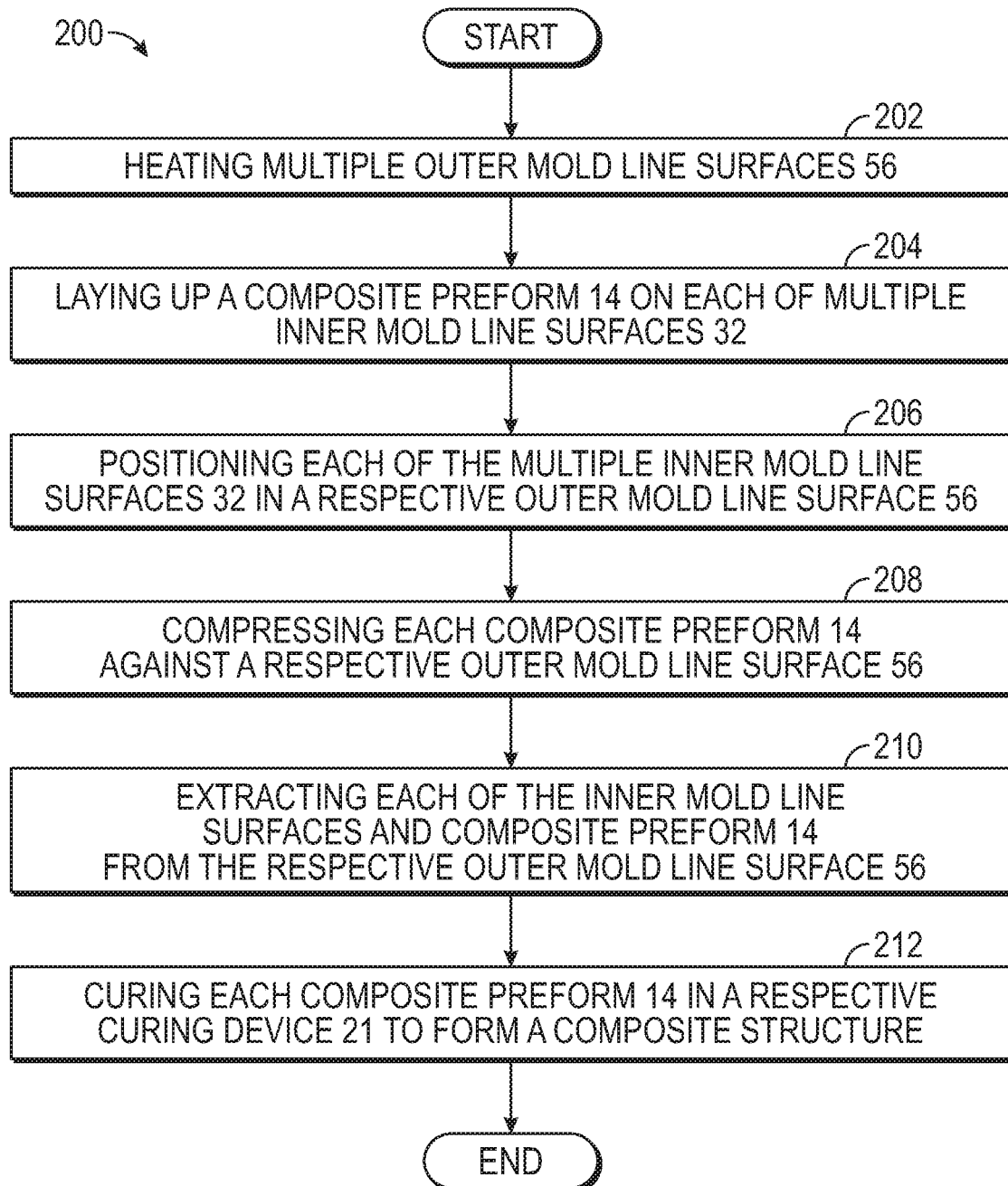
FIG. 7 is an illustration of an exemplary flow diagram of another method of forming a composite structure in accordance with an illustrative embodiment.

Referring to FIG. 7, there is shown an exemplary method 200 that expands the method 100 by utilizing multiple mandrels 18 and multiple tools 20, enabling the parallel processing of multiple composite preforms 14 into multiple composite structures. For example, each tool 20 is configured to correspond to one of a fuselage barrel section of a particular aircraft type, e.g., a nose section, a mid-section, an aft section, a nacelle section, etc. Thus, an entire aircraft fuselage may be fabricated at once in parallel. By creating these composite structures at the same time rather than in series, time is saved and costs are reduced. The details of the operation of each of the mandrels 18 and the tools 20 is the same as discussed previously with respect to method 100.

In block 202, multiple OML surfaces 56 of multiple tools 20 are heated, and in block 204 a composite preform 14 is placed on each of a multiple of IML surfaces 32 of multiple mandrels 18. In block 206, each of the IML surfaces 32 with a composite preform 14 wrapped around the IML surface 32 is placed in a respective OML surface 56. In block 208, each of the composite preforms 14 is compressed against a respective OML surface 56. In block 210, each of the IML surfaces 32 with a respective composite preform 14 wrapped around the IML surface 32 is removed from the respective OML surface 56 once gelled. Each composite preform 14 is then cured in the curing device 21 or one of multiple curing devices 21 to form a respective composite structure of the aircraft.

Figure 8:
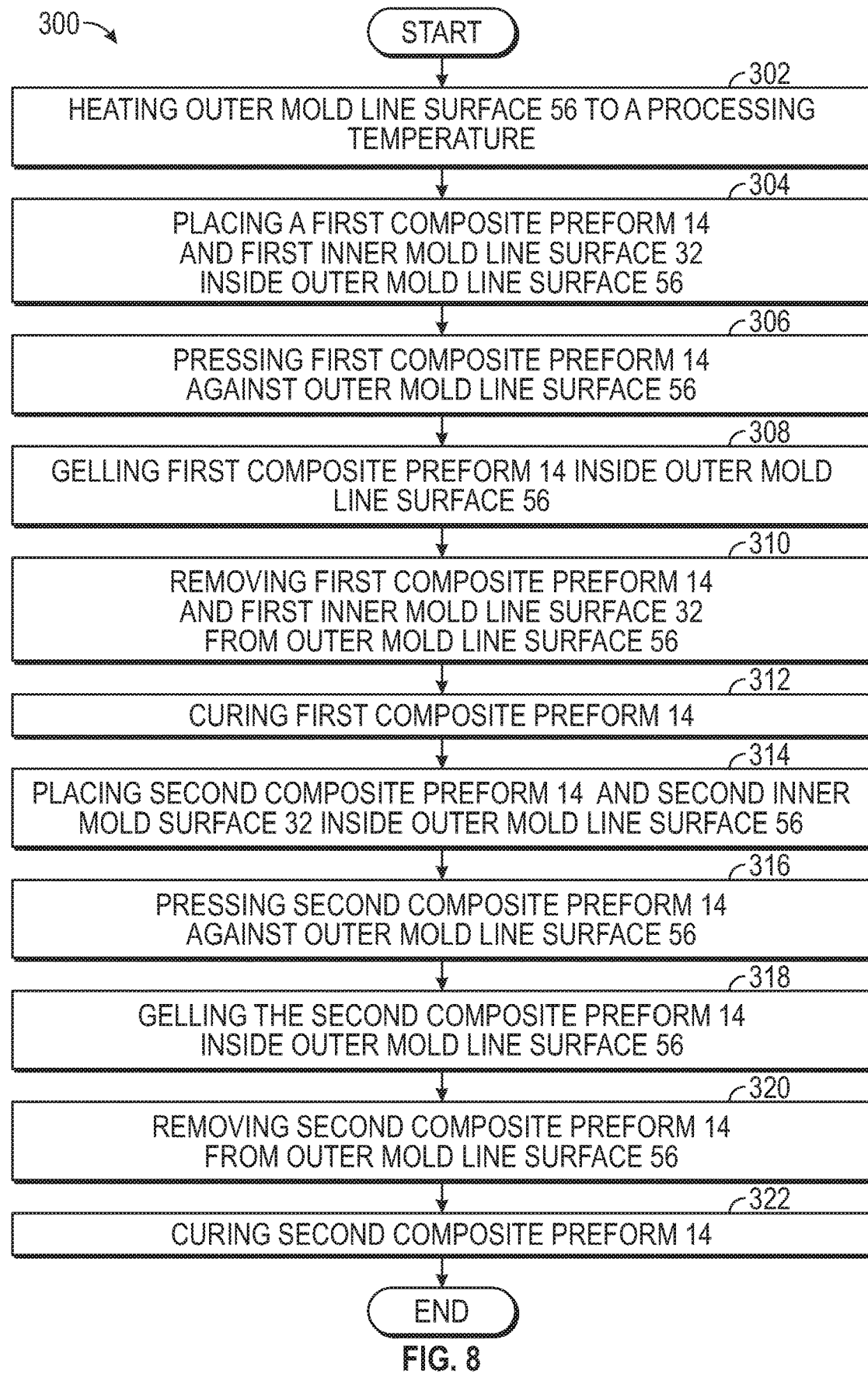
FIG. 8 is an illustration of an exemplary flow diagram of yet another method of forming a composite structure in accordance with an illustrative embodiment.

Referring now to FIG. 8, another exemplary method 300 utilizing the system 10 for fabricating a composite structure is illustrated. In block 302, the OML surface 56 of the tool 20 is heated to a processing temperature between about 180° C. and 215° C. In block 304, the first composite preform 14 disposed on the IML surface 32 of the mandrel 18 is placed inside the OML surface 56 of the tool 20. In block 306, the first composite preform 14 is pressed against the OML surface 56 by inflating the bladder 30. In block 308, the first composite preform 14 remains in the tool 20 until the first composite preform 14 is in a gelled state. In block 310, the first composite preform 14 is removed from the outer mold line surface 56. In block 312, the first composite preform 14 is cured by the curing device 21 to form a composite structure, such as, for example, a nose section, a mid-section, an aft section, a nacelle section, etc.

In block 314, a second composite preform 14' disposed on a second IML surface 32' of a second mandrel 18' is placed inside the OML surface 56 of the tool 20. The temperature of the OML surface 56 is maintained at the processing temperature during the removal of the first composite preform 14 and the placing of the second composite preform 14' into the tool 20. In block 316, the second composite preform 14' is pressed against the OML surface 56 by inflating a second bladder 30'. In block 318, the second composite preform 14' remains in the tool 20 until the second composite preform 14' is in a gelled state. In block 320, the second composite preform 14' is removed from the outer mold line surface 56. In block 322, the second composite preform 14' is cured by the curing device 21 to form another copy of the composite structure.

Figure 9:
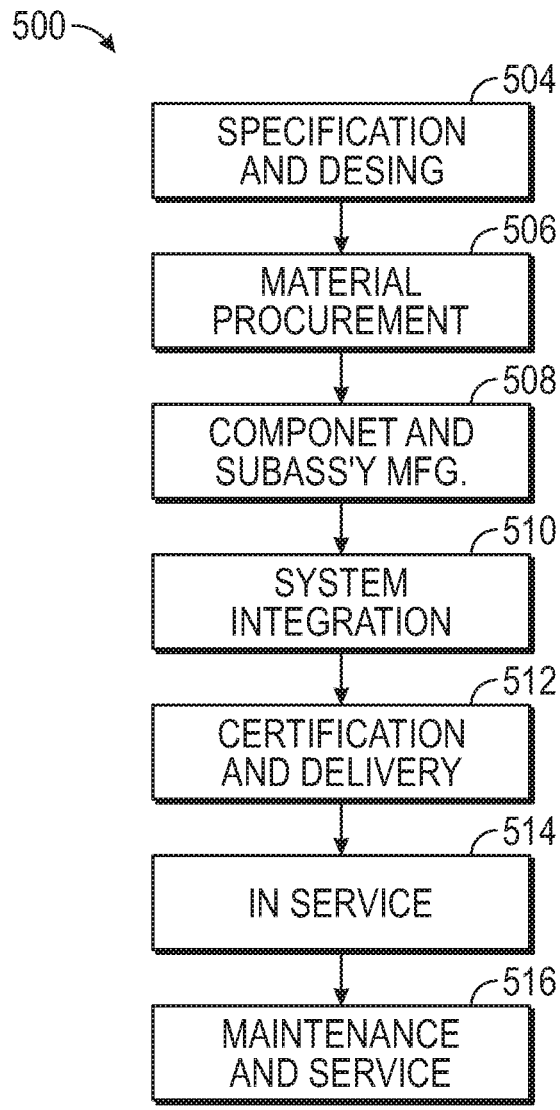
FIG. 9 is an illustration of an exemplary flow diagram of aircraft production and service methodology.
Figure 10:
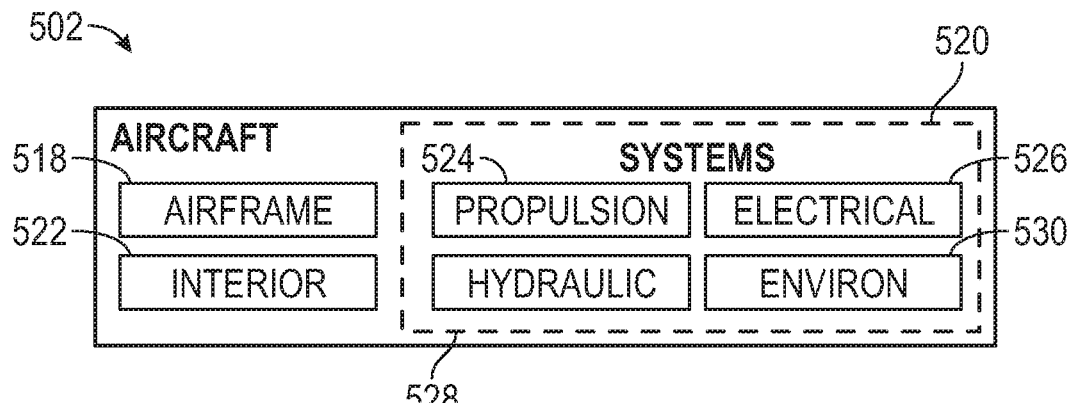
FIG. 10 is an illustration of a block diagram of an aircraft.

Embodiments of the system 10 may be utilized on the component and subassembly manufacturing, system integration, maintenance and service, manufacturing of an airframe. For example, referring to FIGS. 9 and 10, embodiments of the disclosure utilizing the system 10 are described in the context of an aircraft manufacturing and service method 500 (FIG. 9) and an aircraft 502 (FIG. 10). During pre-production, an exemplary method 500 includes specification and design 504 of the aircraft 502 and material procurement 506. During production, component and subassembly manufacturing 508 and system integration 510 of the aircraft 502 occurs. Thereafter, the aircraft 502 undergoes certification and delivery 512 to be placed in service 514. While in service by a customer, the aircraft 502 is scheduled for routine maintenance and service 516 (which may also include modification, reconfiguration, refurbishment, and so on).

Each of the processes of method 500 may be performed or carried out by a system integrator, a third party, and/or an operator (for example, a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 502 produced by exemplary method 500 may include an airframe 518 with a plurality of systems 520 and an interior 522. Examples of high-level systems 520 include one or more of a propulsion system 524, an electrical system 526, a hydraulic system 528, and an environmental system 530. Any number of other systems may be included. Although an aerospace example is shown, the disclosure may also be applied to other industries, such as the automotive industry. The system 10 and methods 100, 200, 300 described herein can be used with component and subassembly manufacturing 508, system integration 510, and fabrication of the airframe 518.

Each of the flow diagrams shown in FIGS. 6-8 depicts an embodiment to illustrate the architecture, functionality, and operation of some possible arrangements of apparatuses and methods in an illustrative embodiment. In this regard, each block in the flow diagrams may represent at least one module, a segment, a function, or a portion of an operation or step. In some alternative arrangements of the illustrative embodiment, the function or functions noted in the blocks may occur out of the order shown in the figures. For example, in some cases, two blocks shown in succession may be performed substantially concurrently, while in other cases the blocks may be performed in the reverse order, depending upon the functionality involved. Also, other blocks may be added, in addition to the illustrated blocks.

A system and method of manufacturing composite structures described in the present disclosure offers several benefits and advantages. Referring generally to the figures, the present disclosure describes a system and method for fabricating both large and small curved composite structures. The system and method enables the utilization of quick cure resins. As such, the quick cure resins allow the composite preform to retain its shape in a short amount of time (that is, the composite preform becomes self-supporting very quickly), which frees up some or all of the tooling for rapid reuse to form another composite section.

Many modifications and variations will be apparent to those of ordinary skill in the art. Further, different illustrative embodiments may provide different features as compared to other desirable embodiments. The embodiment or embodiments selected are chosen and described to best explain the principles of the embodiments, the practical application, and to enable others of ordinary skill in the art to understand the disclosure for various embodiments with various modifications as are suited to the particular use contemplated.

What is claimed is:

1. A method of forming a composite structure for an aircraft, the method comprising:
   heating an outer mold line surface of a tool to a processing temperature;
   positioning an inner mold line surface with a composite preform disposed thereon within the outer mold line surface;
   extracting the inner mold line surface and the composite preform in a gelled state from the outer mold line surface;
   positioning a second inner mold surface with a second composite preform disposed thereon within the outer mold line surface while maintaining the outer mold line surface at the processing temperature;
   compressing the second composite preform against the outer mold line surface by inflating a second bladder;
   extracting the second inner mold line surface and the second composite preform in a gelled state from the outer mold line surface while maintaining the outer mold line surface at the processing temperature; and
   processing the gelled composite preform into an aircraft part selected from the group consisting of a nose section, a mid-section, an aft section, and a nacelle section.

2. The method of claim 1 further comprising placing the composite preform on the inner mold line surface.

3. The method of claim 2 further comprising inflating a bladder on which the composite preform is disposed prior to placing the composite preform on the inner mold line surface.

4. The method of claim 2 further comprising inflating a bladder on which the composite preform is disposed after placing the composite preform on the inner mold line surface.

5. The method of claim 1 further comprising compressing the composite preform against the outer mold line surface.

6. The method of claim 1 further comprising heating the inner mold line surface to transition the inner mold line surface from a rigid state to a flexible state.

7. The method of claim 6 further comprising inflating a bladder disposed within the inner mold line surface when the inner mold line surface is in the flexible state.

8. The method of claim 7 further comprising deflating the bladder after removing the inner mold line surface and the composite preform from the outer mold line surface.

9. The method of claim 7 further comprising placing the composite preform on the bladder when the inner mold line surface is rigid.

10. The method of claim 7 further comprising placing the composite preform on the bladder when the composite preform is at a room temperature.

11. The method of claim 1 further comprising applying a vacuum to the inner mold line surface with the composite preform disposed thereon after the inner mold line surface with the composite preform disposed thereon is positioned within the outer mold line surface.

12. The method of claim 1 further comprising placing the composite preform on a mold release coating disposed on the inner mold line surface.

13. The method of claim 1 wherein processing the gelled composite preform includes curing the composite preform to form the aircraft part after the composite preform has gelled and is removed from the outer mold line surface of the tool.

14. The method of claim 1 further comprising removing the composite preform from the inner mold line surface.

15. The method of claim 1 further comprising compressing the second composite preform against the outer mold line surface by inflating a second bladder.

16. The method of claim 1, wherein the composite preform is impregnated with a thermoset resin.

17. The method of claim 1, wherein the inner mold line surface is rigid at a room temperature.

18. The method of claim 17, wherein the inner mold line surface softens at about 65° C.

19. The method of claim 1, wherein the processing temperature is about 180° C.

20. The method of claim 1, wherein the processing temperature is between about 180° C. to about 215° C.

21. The method of claim 1, wherein extracting includes extraction of the inner mold line surface from the outer mold line surface while the temperature of the outer mold line surface remains at the processing temperature.

22. A portion of an aircraft fabricated according to the method of claim 1.

23. The method of claim 1 further comprising dissolving the inner mold line surface after the inner mold line surface and composite preform have been removed from the outer mold line surface.

\* \* \* \* \*